United States Patent Office 2,736,743
Patented Feb. 28, 1956

2,736,743

REACTION OF VINYL ETHERS AND HYDROGEN DONORS

Claude J. Schmidle, Moorestown, and Richard C. Mansfield, Riverton, N. J., assignors to Rohm & Haas Company, Philadelphia, Pa., a corporation of Delaware No Drawing. Application September 15, 1951,
Serial No. 246,879

10 Claims. (Cl. 260—483)

This invention concerns a process wherein vinyl ethers are reacted with compounds yielding an acidic hydrogen and a carbanion, said reaction being effected in the presence of a mixture of a basic anion-exchange resin and an acidic cation exchanger.

Reactions are known in which very reactive compounds such as hydrogen chloride, hydrogen bromide, carboxylic acids, mercaptans, and phenols combine with vinyl ethers through addition. When, however, vinyl ethers are brought together with compounds having acidic hydrogen on a carbon atom thereof, there does not ordinarily take place any reaction. Alkaline or acidic catalysts do not usually promote reaction although in some cases Michael-type addition reactions have been obtained.

Yet when there are brought together a vinyl ether and a compound yielding a carbanion in the presence of water and of a mixture of a basic anion-exchange resin and an acidic cation exchanger, reaction occurs with splitting out of an alcohol. The reaction may be represented as follows:

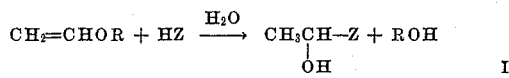

which is often followed by reactions involving the splitting out of water, thus

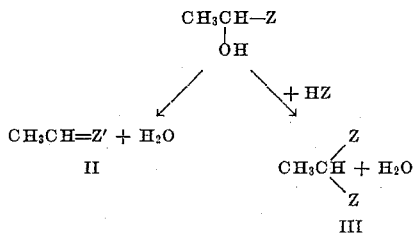

Reaction II occurs when there is available a reactive hydrogen in the carbanion Z which permits formation of water and an unsaturated product. Reaction III is comparable in that water is also split out, but this reaction involves a second molecule of HZ.

In these formulas R represents a hydrocarbon group, preferably one of not over seven carbon atoms and, in particular, a lower alkyl group of not over four carbon atoms. The compound HZ is a hydrogen-containing compound which through loss of a proton is capable of forming a carbanion, an ion containing a carbon atom with an unshared electron pair.

As typical vinyl ethers which can be used, there may be mentioned vinyl methyl ether, vinyl etheyl ether, vinyl butyl ether, vinyl allyl ether, vinyl benzyl ether, vinyl cyclohexyl ether, vinyl phenyl ether, and the like. While ethers with larger substituents, such as vinyl octyl ether or vinyl dodecyl ether, can be subjected to the reactions of this invention, there is no advantage in using these relatively large molecules.

The reactants summarized by the general formula HZ contain an acidic hydrogen attached to a carbon atom of the carbanion Z. Such compounds may be acyclic or cyclic. The simplest is hydrogen cyanide. A useful subclass of compounds is provided by the nitroalkanes in which the carbon atom carrying a nitro group also carries hydrogen, such compounds being represented by nitromethane, nitroethane, nitropropane, ntirobutane, and the like. Another subclass is comprised of compounds having hydrogen on a carbon in juxtaposition to at least one carbonyl group as in acetoacetic esters or monoalkyl acetoacetic esters, malonic esters, 1,3-diketones, malonamides, cyanoacetates, cyanoacetamides, diacetosuccinates, ketones, and aldehydes. Specific examples of this type of compound are methyl acetoacetate, ethyl acetoacetate, ethyl cyanoacetate, acetoacetanilide, dimethyl malonate, diethyl malonate, acetone, methyl ethyl ketone, methyl hexyl ketone, diethyl ketone, acetophenone, isobutylaldehyde, etc. In another group of compounds a methylenic hydrogen is activated by the juxtaposition of an aromatic ring, as in benzyl cyanide, desoxybenzoin, fluorene, indene, or anthrone. There are other cyclic compounds in which an acidic hydrogen is found on a carbon atom, as, for example, in α- and γ-methylpyridine, 2-methylthiazole, pyrazolone, etc. Other reactive compounds include 2,4-dinitrotoluene, trinitrotoluene, chloroform, acetylene, and the like.

The above compounds belong to a class which is characterized by the presence of an acidic hydrogen atom on a carbon atom, which hydrogen atom is exchangeable with deuterium under the influence of a basic catalyst. One subclass of these compounds has acidic hydrogen of sufficient activity to be readily replaceable with sodium. This subclass is of considerable interest because of the ease with which the compounds can be reacted under the conditions of the process here disclosed. The subclass can be distinguished by the fact that the compounds thereof have a

group which reacts with an alkali metal alcoholate to replace the indicated hydrogen of said group with an alkali metal.

For preparation of the mixture of anion-exchange resins and cation exchangers there may be used any basic anion-exchange resin. Such resin may depend for its activity on amino groups or upon quaternary ammonium groups. Typical amino-containing resins are the insoluble condensates of a phenol, formaldehyde, and analkylenepolyamine, or phenylenediamine and formaldehyde, or melamine and/or urea, formaldehyde, and guanidine. Another effective amino-type exchanger is made by reacting chloromethylated copolymers of styrene and polyvinylbenzene with simple amines such as dimethylamine or polyamines such as diethylenetriamine, triethylenetetramine, or the like. Reaction of such chloromethylated copolymers with tertiary amines, such as trimethylamine, triethylamine, pyridine, benzyldimethylamine, hydroxyethyldimethylamine, or the like leads to quaternary ammonium salts which are converted with alkaline solutions to basic forms. There may thus be used sodium hydroxide solutions or sodium carbonate solutions to convert the quaternary ammonium chloride groups to strongly basic groups. Further details of basic anion exchangers of the latter types are given in Application Serial No. 759,308 and 759,309, filed July 5, 1947, now U. S. Patent 2,591,573 and 2,591,574 respectively, issued on April 1, 1952. Various types of anion-exchange resins have been available commercially.

Cation exchangers are insoluble substances having acidic groups, in particular sulfonic or carboxylic groups. They may be prepared from a natural product, such as coal or lignite, by reaction with a sulfonating agents, such as sulfuric acid, sulfur trioxide, or chlorosulfonic acid.

They may be made from phenolfomaldehyde resins which are sulfonated in the rings or contain omega-sulfonate groups, introduced, for example, by reaction of formaldehyde and a sulfite. Somewhat related resins are prepared by sulfonating copolymers of styrene and polyvinylbenzene. Typical carboxylic resins are prepared by copolymerization of acrylic or methacrylic acid and divinylbenzene or from interpolymers of maleic anhydride, styrene, and polyvinylbenzene. Typical examples of these various cation exchangers have been or are on the market. If they are obtained in a salt form, they are readily converted to their hydrogen form upon being treated with a dilute solution of a strong acid, such as hydrochloric acid or sulfuric acid.

Ion-exchange materials are usually prepared in granular form in a size of 10 to 50 mesh. The two kinds of ion exchangers may be mixed in granular form or they may be used in the form of powders.

Ratios of acidic cation exchangers to basic anion-exchange resin may be widely varied. In many cases a mixture of equivalent amounts of the two types of materials is useful and effective. Yet either type of exchanger may be used in stoichiometric excess. Ratios of the two types may conveniently be varied from 10:1 to 1:10 on a weight basis.

To effect reaction between vinyl ether and acidic hydrogen-containing compound which yields a carbanion these reactants together with water are brought together in the presence of a mixture of acidic cation exchanger and basic anion-exchange resin. The temperature for the reaction is between about 0° and 100° C. under pressure, if necessary, and preferably between 10° and 60° C., and may be controlled by heating or cooling as desirable to maintain the reaction. Inert organic solvents, particularly those miscible with water, may, if desired, be used.

The reaction may be performed batchwise or it may be carried out in a continuous manner by passing the reactants over a mixture of exchangers in a column. The column may be jacketed to permit control of the temperature of the reactants on the exchangers. The product is separated from the reaction mixture by conventional methods and purified, if so desired.

In the cases in which the carbanion Z still contains a reactive hydrogen, the product finally isolated is commonly an unsaturated one or one containing two Z groups, both kinds of product resulting from elimination of a mole of water.

Further details are given in the following typical preparations according to the process of this invention. Parts shown are by weight.

*Example 1*

There were mixed 48 parts of vinyl ethyl ether, 61 parts of nitromethane, 45 parts of water, 15 parts of an anion-exchange resin having quaternary ammonium hydroxide groups in the form of trimethylammoniummethyl groups attached to the rings of a styrenedivinylbenzene copolymer, and 15 parts of a sulfonated styrenedivinylbenzene copolymer. The mixture was stirred for four hours and maintained between 30° and 35° C. by cooling. It was filtered. The filtrate was distilled. At 105°–110° C./25 mm. there was obtained a fraction which consisted of nitropropanol in an amount of 41 parts. There remained a still residue of 16 parts of higher boiling material.

In place of nitromethane there may be used other nitroalkanes in which the carbon in juxtaposition to the nitro group carries at least one hydrogen. Nitroalkanes of one to four carbon atoms are of particular interest.

*Example 2*

A mixture of 64 parts of vinyl butyl ether, 61 parts of nitromethane, 45 parts of water, and the mixture of resins from Example 1 was stirred and maintained between 35° and 45° C. for six hours. Upon distillation of the liquid from the reaction mixture there was obtained a fraction at 105°–110° C./25 mm. amounting to 40 parts. It was 2-hydroxy-1-nitropropane.

The vinyl alkyl ethers having alkyl groups of not over four carbon atoms are the most useful, as they are made from inexpensive alcohols and the alcohol which is formed therefrom is readily separated after the reaction with the hydrogen-bearing reactant.

*Example 3*

There were mixed 36 parts of vinyl ethyl ether, 135 parts of ethyl acetoacetate, 20 parts of water, 15 parts of a basic anion-exchange resin having hydroxyethyldimethylammoniummethyl substituents in a styrene-divinylbenzene copolymer, and 15 parts of a sulfonated styrene-divinylbenzene copolymer. The mixture was stirred for four hours and maintained between 30° and 35° C. Stirring was continued for 16 hours with the mixture at approximately room temperature. The mixture was filtered to separate the resins. The filtrate was distilled. At 130° C./1 mm. there was obtained a fraction of 82 parts which was ethylidene bis(ethyl acetoacetate).

In place of ethyl acetoacetate other acetoacetates may be used, such as methyl acetoacetate, propyl acetoacetate, or butyl acetoacetate, the acetoacetate esters of saturated lower aliphatic alcohols being of primary interest here.

*Example 4*

There were mixed 36 parts of vinyl ethyl ether, 150 parts of acetone, 45 parts of water, 15 parts of a basic anion-exchange resin having benzyldimethylammoniummethyl groups in a styrene-divinylbenzene copolymer, and 15 parts of an acidic sulfonated phenol-formaldehyde resin. The mixture was stirred for seven hours during which time it was maintained between 30° and 40° C. The mixture was filtered. The filtrate was distilled. At 110°–130° C. there was obtained a fraction of 26 parts consisting of ethylidene acetone.

The comparable reaction is obtained with other ketones having a methyl group attached to the carbonyl group. Ketones with larger carbonyl substituents also react so long as the carbon next to the carbonyl group carries a replaceable hydrogen.

*Example 5*

There were mixed 15 parts of a coarsely powdered acidic sulfonated styrene-divinylbenzene copolymer, 15 parts of a basic anion exchanger having trimethylammoniummethyl substituents on a styrene-divinylbenzene copolymer, 20 parts of water, 48 parts of vinyl ethyl ether, and 140 parts of pentanedione. The mixture was stirred for six hours while the temperature was not allowed to exceed 45° C. and was kept above 35° C. The mixture stood for 16 hours and was stirred and heated to 60° C. for three hours. It was filtered and the filtrate was distilled. At 120°–125°° C./1 mm. there was obtained a fraction of 33 parts, corresponding in composition to ethylidene bispentanedione.

*Example 6*

There were mixed 15 parts of each of the resins used in Example 5, 20 parts of water, 36 parts of vinyl ethyl ether, and 60 parts of diethyl malonate. The mixture was stirred and maintained at 30°–40° C. for four hours and at about 70° C. for four hours. The mixture was filtered and the filtrate was distilled. A fraction of 27 parts was obtained at 81°–86° C./1 mm. which corresponded in composition to ethylidene bis(ethyl malonate).

Other malonates, particularly those from saturated lower aliphatic monohydric alcohols (those with not over four carbon atoms) can be used in place of the above ethyl malonate with a comparable end product resulting.

*Example 7*

There were mixed 15 parts of a granular (20–50 mesh) basic amino resin formed by reaction of polyethylene polyamines and a chloromethylated styrene-divinylbenzene copolymer followed by treatment with a sodium carbonate solution, 15 parts of granular (40–80 mesh) sulfonated styrene-divinylbenzene copolymer and 50 parts of water in which there had been dissolved in the cold 27 parts of freshly distilled hydrogen cyanide. Thereto there was slowly added 72 parts of vinyl ethyl ether with cooling to maintain the mixture below 25° C. The mixture was stirred for two hours and filtered. The filtrate was acidified with a little phosphoric acid and distilled. At 81°–85° C./12–15 mm. there was obtained a fraction of 49 parts of lactonitrile. The refractive index of this material was 1.4031 at 20° C.

*Example 8*

There were mixed 15 parts of a copolymer of styrene and divinylbenzene containing dimethylhydroxyethylammoniummethyl hydroxide groups attached to the aromatic nuclei thereof and 50 parts of cold water. Thereto were added 70 parts of vinyl ethyl ether and then, with the mixture externally cooled, 27 parts of freshly distilled hydrogen cyanide. There were then added 18 parts of a carboxylic cation-exchange resin in its hydrogen form. The mixture was stirred for an hour in the cold and then allowed to warm up and left standing overnight. The liquid was drained from the resins, acidified with a little phosphoric acid, and subjected to distillation. Lactonitrile was separated as in the previous example.

The primary reaction which is here disclosed may be summarized by the equation

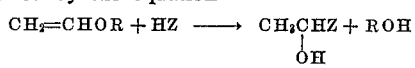

where Z represents such groups as

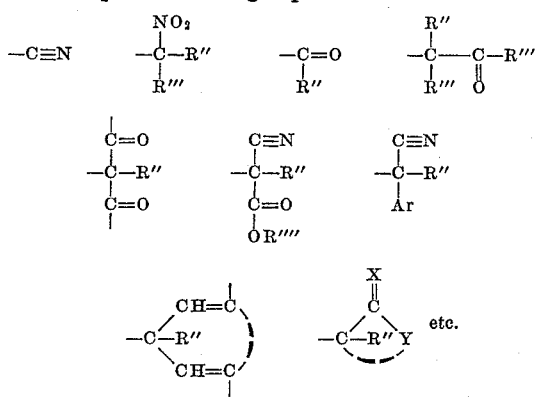

where R'' and R''' represent hydrogen or alkyl or aryl groups, R'''' represents an alkyl or aryl group, X represents oxygen or sulfur, and Y represents atoms completing a cycle in which N, S, >CO, >CS, or doubly bonded carbon atoms occur. When the compound HZ is particularly reactive, it tends to provide a secondary reaction with the above indicated product to form the compound $CH_3CHZ_2$, as has been shown above. Another type of secondary reaction, when Z contains a reactive hydrogen, is formation of an unsaturated compound by elimination of water from the primary product. The reaction is characterized in any case by the introduction of a $CH_3CH=$ group onto a carbanion.

We claim:

1. A process in which the $CH_3CH=$ group is joined to a carbanion which comprises reacting a vinyl alkyl ether in which the alkyl group contains not over four carbon atoms, and an organic compound having an acidic hydrogen on a carbon atom and yielding a carbanion, the said compound containing a =CH— group which reacts with an alkali metal alcoholate to replace the hydrogen thereof with an alkali metal, said reaction being effected in liquid phase in the presence of water and of a mixture of a basic anion-exchange resin and an acidic cation exchanger, and separating an alcohol and the reaction product of said ether and organic compound.

2. A process which comprises reacting a vinyl akyl ether in which the alkyl group contains not over four carbon atoms, and a nitroalkane having hydrogen on the carbon atom carrying the nitro group, said reaction being effected in liquid phase in the presence of water and of a mixture of a basic anion-exchange resin and an acid cation exchanger, and separating an alcohol and a hydroxynitroalkane.

3. The process of claim 2 in which the nitroalkane is nitromethane.

4. A process which comprises reacting a vinyl alkyl ether having an alkyl group of not over four carbon atoms, and an organic compound having hydrogen on a methylenic carbon atom in juxtaposition to at least one carbonyl group, the hydrogen on said methylenic carbon atom being replaceable with an alkali metal by reaction with an alkali metal alcoholate, said reaction being effected in liquid phase in the presence of water and of a mixture of a basic anion-exchange resin and an acidic cation exchanger, and separating an alcohol and an alkylidene reaction product from said ether and said compound.

5. A process which comprises reacting vinyl alkyl ether in which the alkyl group contains not over four carbon atoms, and an ester of malonic acid and two molar proportions of a saturated lower aliphatic monohydric alcohol, said reaction being effected in liquid phase in the presence of water and of a mixture of a basic anion-exchange resin and an acidic cation exchanger, and separating an alcohol and an ethylidene bismalonate.

6. A process which comprises reacting a vinyl alkyl ether in which the alkyl group contains not over four carbon atoms and diethyl malonate, said reaction being effected in liquid phase in the presence of water and of a mixture of a basic anion-exchange resin and an acidic cation exchanger, and separating a lower alkanol and tetraethyl ethylidene bismalonate.

7. A process which comprises reacting vinyl ethyl ether and diethyl malonate, said reaction being effected in liquid phase in the presence of water and of a mixture of basic anion-exchange resin and an acidic cation exchanger, and separating ethanol and tetra ethyl ethylidene bismalonate.

8. A process which comprises reacting a vinyl alkyl ether in which the alkyl group contains not over four carbon atoms and an acetoacetic ester of a saturated lower aliphatic monohydric alcohol, said reaction being effected in liquid phase in the presence of water and of a mixture of a basic anion-exchange resin and an acidic cation exchanger, and separating an alcohol and an ethylidene bisacetoacetate.

9. The process of claim 8 in which the acetoacetate is ethyl acetoacetate.

10. The process of claim 9 in which the ether is vinyl ethyl ether.

References Cited in the file of this patent

UNITED STATES PATENTS

| 2,165,962 | Mueller-Cunradi | July 11, 1939 |
| 2,342,119 | Bruson | Feb. 22, 1944 |
| 2,398,757 | Loder | Apr. 16, 1946 |
| 2,399,625 | Coffman | May 7, 1946 |
| 2,533,172 | McKinley | Dec. 5, 1950 |
| 2,566,559 | Dolnick et al. | Sept. 4, 1951 |
| 2,579,580 | Howk et al. | Dec. 25, 1951 |
| 2,593,417 | D'Alelio | Apr. 22, 1952 |

OTHER REFERENCES

"Amberlite IRA—400 (oH)," published by Rohm & Haas Company, Philadelphia, pp. 1–3 (1949), (revised September, 1950).

Amberlite IRA—400," published Ibid., appendix following page 6, March, 1950.

"Amberlite IR—120 (H)," published Ibid., pp. 1–3 (1950), (revised September, 1950).